Feb. 7, 1933. K. TANIGUCHI 1,896,498
EGG SEPARATOR
Filed Feb. 18, 1931 2 Sheets-Sheet 1

Inventor
Kyusaburo Taniguchi
By his Attorney

Feb. 7, 1933.    K. TANIGUCHI    1,896,498
EGG SEPARATOR
Filed Feb. 18, 1931    2 Sheets-Sheet 2

Inventor
Kyusaburo Taniguchi
By his Attorney
Willis B Rice

Patented Feb. 7, 1933

1,896,498

UNITED STATES PATENT OFFICE

KYUSABURO TANIGUCHI, OF NEW YORK, N. Y.

EGG SEPARATOR

Application filed February 18, 1931. Serial No. 516,733.

This invention relates to egg separators.

It is an object of this invention to provide a new and improved device which will separate the yolk from the white of an egg efficiently and promptly.

It is a further object to provide a device of the character described which will effect the separation as a continuous process so that when desired a number of eggs may be handled efficiently.

It is a further object to provide a device which will remove from the yolk the last remnants of the white without danger of breaking the yolk covering.

It is a further object to provide a device which will permit an inspection of the egg after it has been broken before it is permitted to join the eggs previously opened, in order to permit the discarding of any egg which may not be perfectly fresh.

It is a further object to provide a device in which the yolk and the white may be discharged into separate containers automatically.

Other objects of the invention will in part be obvious and will in part appear hereinafter.

The invention accordingly comprises the features of construction, combinations of elements, and arrangements of parts, which will be exemplified in the construction hereinafter set forth and the scope of the application of which will be indicated in the claims.

For a fuller understanding of the nature and objects of the invention reference should be had to the following detailed description taken in connection with the accompanying drawings, in which:—

Figure 1:
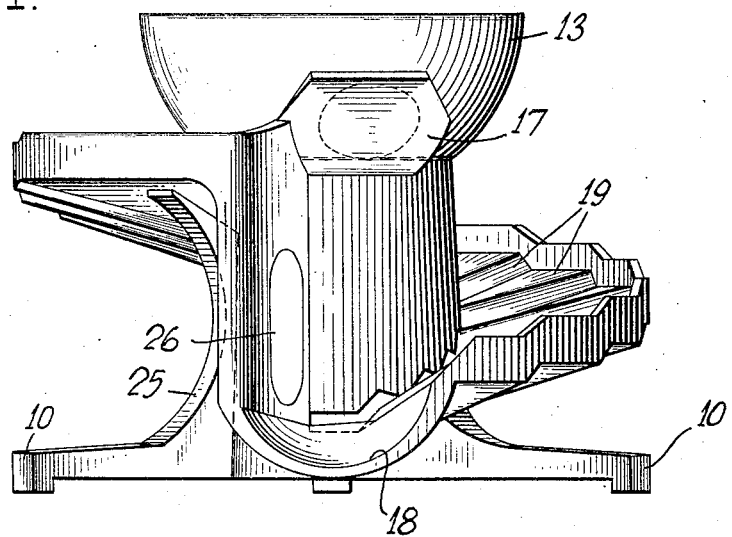
Figure 1 is an elevation of a device made in accordance with this invention, with the upper cup closed.

The device as here embodied may comprise generally an inclined passageway down which the egg may travel adjacent to a slot of sufficient width to permit the entrance of the white but too narrow to permit the passage of the yolk. This passageway may be made in helical form for convenience, and may be designed to retard the passage of the yolk along it in order to give time for the white to separate.

As here illustrated, the device comprises primarily a spider 10 adapted to embrace the upper edge of a container 11 for receipt of the whites of the separated egg. Centrally disposed upon this spider is a hollow column 12 upon the top of which rests an egg receiving cup 13. This cup may be provided at its bottom with downwardly extending flanges 14 adapted to fit within and engage the interior of the top of the hollow column 12, and the cup 13 may also be provided with an annular bearing surface 15, adapted to rest upon the top of the column. In this manner the cup may be removed from the column when desired, to afford easy access to the interior thereof for cleaning purposes, and, moreover, it may be rotated about the axis of the column, for a purpose to be described.

At one point in its outer wall adjacent to the bottom of the cup, there may be provided an outlet 16 to permit the egg to run out of the cup. Some convenient means may be provided to permit the inspection of the egg while still within the cup 13 and to permit the dumping of the egg out of the cup in the event that it is spoiled, without permitting it to pass through the opening 16. For this purpose, a closure means may be provided supported from any convenient portion of the device. In smaller sizes where it is possible to lift the entire device to discard a spoiled egg, this closure may take the form herein shown in which it is supported directly from the standard. A gate 17 may be carried by the column 12 in position to close the opening 16 when in registry therewith, but it will be clear that as the cup is rotated, the opening 16 will pass out of registry with the gate to permit the discharge of the egg.

Figure 2:
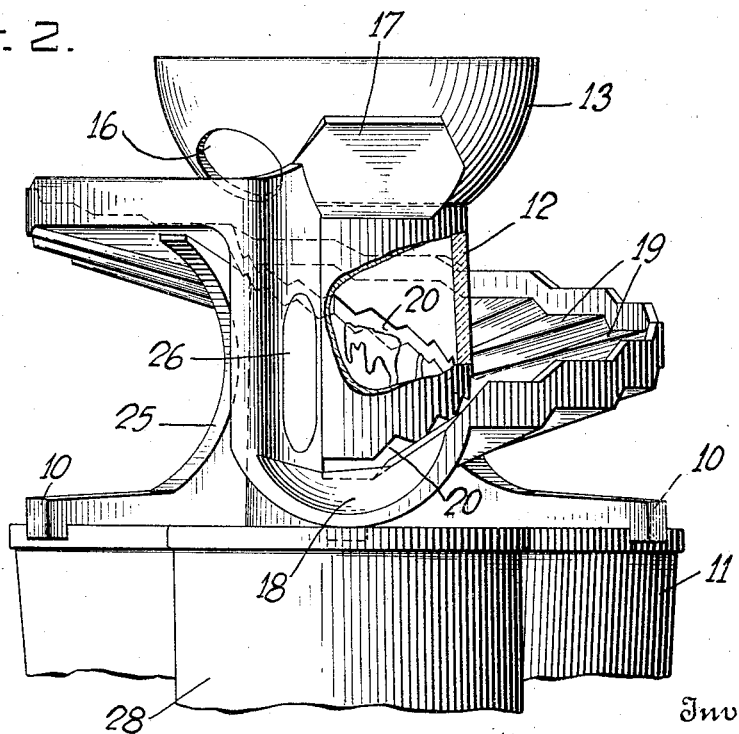
Figure 2 is a similar view, parts being cut away more clearly to show the construction, the device being associated with the containers with which it is to be used and the upper cup being open.
Figure 3:
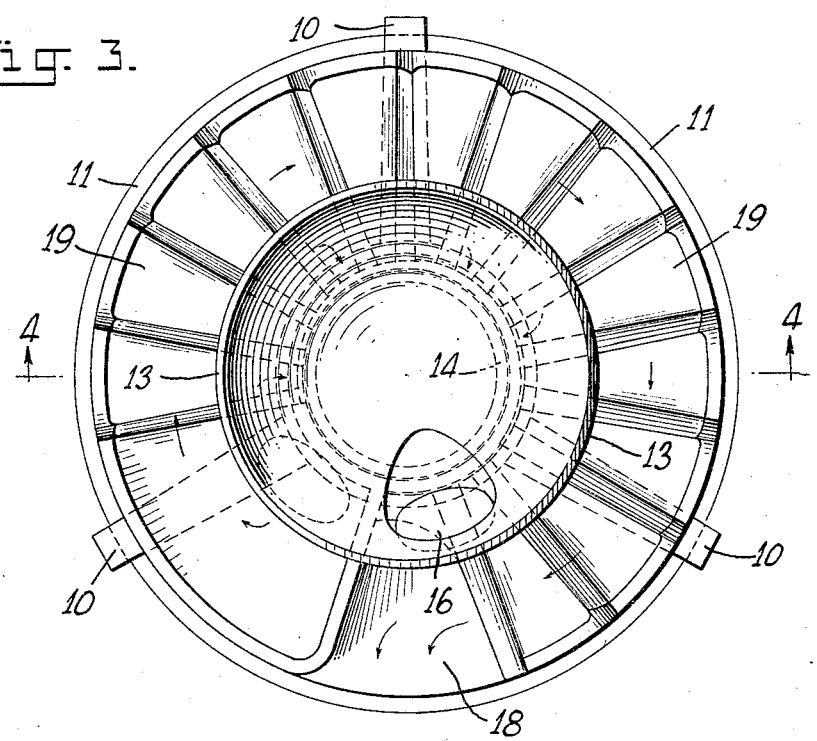
Figure 3 is a top plan view and Figure 4 is a vertical section along the line 4—4 of Figure 3.
Figure 4:
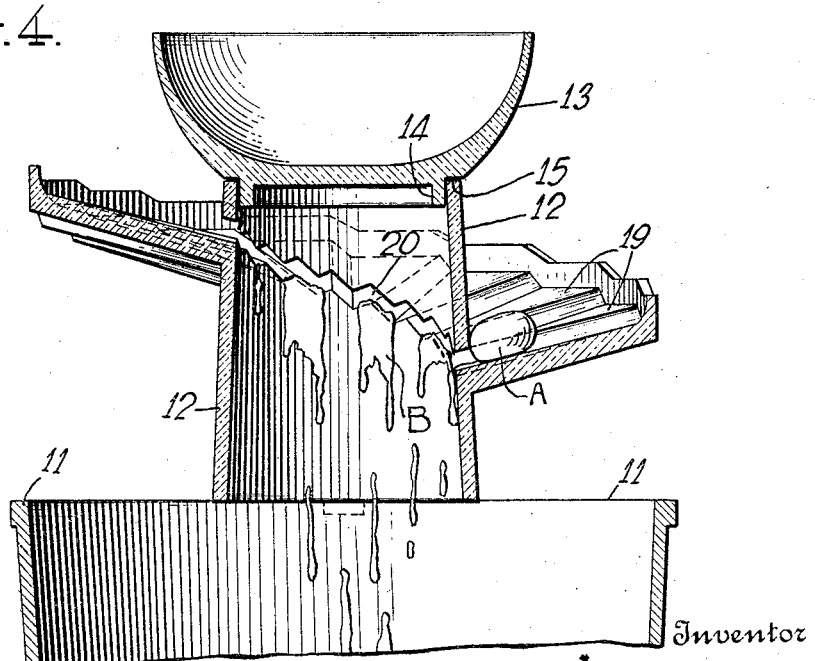

Upon the exterior of the column 12 there is provided a generally helical pathway leading from the delivery point of the opening 16, as seen in Figure 2 to a yolk discharging spout 18, at the bottom, and the pitch and construction of this surface is such as to cause the egg to run slowly down it.

This helical surface may bear resemblance to a circular staircase having a series of steps 19 leading from the top to the bottom. These steps are inclined downwardly toward the column so that as the egg passes slowly down the helical surface, it is caused to hug the column. The column itself is provided with a slot 20 at the inner edges of these steps and conforming to the shape of the steps. This slot is of sufficient width to permit the white to pass through it, to be discharged through the interior of the column into the container 11, but the slot is also sufficiently narrow to confine the yolk. In this manner as the egg descends, it rolls over and over about a horizontal axis because of its contact with the steps, and about a vertical axis because of its contact with the vertical column 12. In this manner, substantially every portion of the surface of the yolk is brought adjacent to the slot 20, to permit any white that may be adhering to it, to flow off.

Each of the steps is designed to slant downwardly and backwardly toward the riser of the next step above and the steps are made progressively higher toward the bottom of the staircase. In this manner, the progress of the yolk down the staircase is retarded and this retarding effect is altered as the yolk becomes more free from the white.

In the separation of eggs, one of the prominent factors is the tendency of the white to hang together, and in this separator that factor is used to assist in effecting the complete separation. It is preferable to make the slot 20 a continuous one from top to bottom since in this manner that portion of the white which has passed through the slot assists, by reason of its weight, in pulling the remainder of the white away from the yolk.

A vertical radially disposed brace 25 preferably extends throughout the height of the column 12 in order to strengthen the device and to assist in holding the top portion of the column above the slot, in its proper relation to the bottom portion and to the spider, and this brace may have a central finger hole 26 to assist in lifting the device. This separator may be made of any convenient material, such as glass or metal, and in some cases it may be desirable to provide additional members to assist in supporting the top of the column and to maintain the width of the slot, but such additional bracing is not here illustrated as its form will be obvious, once the material for the construction of the device has been selected.

In operating the device, it will be clear that the egg may be broken into the cup 13 while the opening 16 is in registry with the gate 17. As soon as it is determined that the egg is of good quality the cup may be turned to permit the egg to flow out on the top of the helical surface. As the egg passes down the staircase, it tends to hug the central pillar, the yolk rotating both vertically and horizontally in a manner to expose the surface of the yolk to the separating slot. During the initial portions of this journey, the large volume of white present passes through the slot, as shown at 20b, pulling itself away from the yolk. This white 29 tends to cling together and ultimately to remove itself from the yolk 28 before the latter reaches the discharge spout 18. Thereafter, by reason of the fact that the spout 18 is inclined outwardly, the yolk moves toward the outer edge of the spout and is discharged into a container 28, situated for that purpose.

In the operation of this device, it will be found that the eggs move gradually down the inclined surface, separating as they go and discharging themselves from the device so that any number of eggs in succession may be separated.

It will also be found that the separation is clean and without damage to the outer covering of the yolk.

Since certain changes may be made in the above construction and different embodiments of the invention could be made without departing from the scope thereof, it is intended that all matter contained in the above description or shown in the accompanying drawing shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Having described my invention, what I claim as new and desire to secure by Letters Patent, is:—

1. A device of the character described including elements forming an inclined V-shaped groove having steps upon one side of said V and a slot at the bottom thereof too narrow to permit the passage of the yolk, the steps upon said side increasing in height toward the bottom of the incline.

2. A device of the character described including a central hollow column having a substantially continuous helical slot therein and means surrounding said slot for causing an egg to pass downwardly in contact with the walls of said slot, said slot being too narrow to permit the passage of a yolk, whereby the white of an egg is discharged through said slot to the interior of the column.

3. A device of the character described comprising a hollow column, a substantially continuous spiral slot through the walls of said column and means to confine an egg to cause it to pass along said slot in contact with the walls thereof.

4. A device of the character described comprising a hollow column, a substantially continuous spiral slot through the walls of said column and means to confine an egg to cause it to pass along said slot in contact with the walls thereof, and a receiving cup positioned to discharge an egg adjacent to the upper portion of said slot.

5. A device of the character described including a central pillar, a helicoidal surface concentric with said pillar, said device having a substantially continuous slot at the juncture of said surface and said pillar, said surface being inclined toward said pillar whereby an egg yolk is caused to travel down said surface adjacent to said pillar, and means adapted to retard the passage of the yolk down said surface.

6. A device of the character described including a central hollow column having a substantially continuous stepped helical slot therein and means surrounding said slot for causing an egg to pass downwardly in contact with the walls of said slot, said slot being too narrow to permit the passage of a yolk, whereby the white of an egg is discharged through said slot to the interior of the column.

7. A device of the character described comprising a hollow column, a spiral stepped slot through the walls of said column and means to confine an egg to cause it to pass along said slot in contact with the walls thereof.

8. A device of the character described including a hollow column, a substantially continuous spiral slot through the walls of said column, a helical surface attached to said column substantially at the lower edge of said slot and inclined inwardly toward said column, a receiving cup fitting upon the top of said column and having an opening discharging onto the upper end of said helical surface and means for closing said opening.

KYUSABURO TANIGUCHI.